(12) United States Patent
Ohlendorf

(10) Patent No.: US 8,388,805 B2
(45) Date of Patent: Mar. 5, 2013

(54) COARSE SEPARATOR

(75) Inventor: Oliver Ohlendorf, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 1593 days.

(21) Appl. No.: 11/283,389

(22) Filed: Nov. 17, 2005

(65) Prior Publication Data

US 2006/0107634 A1 May 25, 2006

(30) Foreign Application Priority Data

Nov. 25, 2004 (DE) .......................... 10 2004 056 856

(51) Int. Cl.
*D21F 11/00* (2006.01)

(52) U.S. Cl. ......... 162/156; 210/521; 55/385.1; 55/442; 55/443; 55/428; 55/429; 451/453

(58) Field of Classification Search .................. 210/521; 55/385.1, 442, 443, 428, 429; 96/392, 393; 451/453, 456; 173/197–199
See application file for complete search history.

(56) References Cited

U.S. PATENT DOCUMENTS

| | | | | | |
|---|---|---|---|---|---|
| 1,898,887 | A | * | 2/1933 | Naul | 15/142 |
| 2,076,815 | A | * | 4/1937 | Fulweiler | 95/267 |
| 2,182,862 | A | * | 12/1939 | Allardice | 95/271 |
| 2,384,414 | A | * | 9/1945 | Antrim | 55/329 |
| 3,237,386 | A | * | 3/1966 | Farr et al. | 55/443 |
| 3,378,994 | A | * | 4/1968 | Farr | 55/324 |
| 3,616,624 | A | * | 11/1971 | Marsh | 55/472 |
| 3,757,892 | A | * | 9/1973 | Raudman, Jr. | 181/256 |
| 4,119,419 | A | * | 10/1978 | Passaro et al. | 96/399 |
| 4,205,732 | A | * | 6/1980 | Auerbach et al. | 181/230 |
| 4,373,300 | A | * | 2/1983 | Partridge | 451/453 |
| 4,434,564 | A | * | 3/1984 | Braggins, Jr. | 34/86 |
| 4,555,874 | A | * | 12/1985 | Chung | 451/453 |
| 5,199,501 | A | | 4/1993 | Kluber et al. | |
| 5,591,075 | A | * | 1/1997 | Chang | 451/451 |
| 6,161,627 | A | * | 12/2000 | Seith et al. | 173/93.5 |
| 6,514,131 | B1 | * | 2/2003 | Reich et al. | 451/344 |
| 6,641,634 | B2 | * | 11/2003 | Reich et al. | 55/385.1 |
| 6,887,146 | B2 | * | 5/2005 | Staas et al. | 454/66 |

(Continued)

FOREIGN PATENT DOCUMENTS

| | | | |
|---|---|---|---|
| DE | 3906371 A1 | * | 10/1989 |
| EP | 1477273 | | 11/2004 |
| GB | 2288344 | | 10/1995 |
| GB | 2340056 | | 2/2000 |
| WO | 03055574 | | 7/2003 |

OTHER PUBLICATIONS

The American Heritage Dictionary of the English Language: Fourth Edition 2000.*
Search Report.

*Primary Examiner* — Jason M Greene
*Assistant Examiner* — Anthony Shumate
(74) *Attorney, Agent, or Firm* — Abelman, Frayne & Schwab

(57) ABSTRACT

A coarse separator (10) for a power tool (2) is used for separating, at least partially, from an air flow (L), material particles (M) produced during operation of the power tool (2) and aspirated by a suction device (8), and includes an inlet opening (48) connectable with the suction head (6) of a suction device (8) that aspirates the particles, an outlet opening (40) for letting a purified air flow (L) out, and a lamella separator arranged between the inlet opening (48) and the outlet opening (40).

8 Claims, 4 Drawing Sheets

U.S. PATENT DOCUMENTS

| | | |
|---|---|---|
| 7,047,647 B1 * | 5/2006 | Muller et al. .................... 30/124 |
| 7,354,226 B2 * | 4/2008 | Britz ................................ 408/67 |
| 2002/0129949 A1 * | 9/2002 | Bongers-Ambrosius et al. ............................ 173/217 |
| 2004/0177980 A1 * | 9/2004 | Lucas ........................... 173/169 |
| 2005/0037699 A1 * | 2/2005 | Park .............................. 451/344 |
| 2005/0150199 A1 * | 7/2005 | Michele et al. ............... 55/385.1 |
| 2005/0188498 A1 * | 9/2005 | Thanner et al. ................. 15/344 |

* cited by examiner

COARSE SEPARATOR

BACKGROUND OF THE INVENTION

1. Field of the Invention

The present invention relates to a coarse separator for a power tool for separating, at least partially, from an air flow, material particles produced during operation of the power tool and aspirated by a suction device including a suction head. The coarse separator includes an inlet opening connectable with the suction head, an outlet opening for letting a purified air flow out, and separation means arranged between the inlet opening and the outlet opening.

2. Description of the Prior Art

Coarse separators of the types described above are primarily used for separating particles with a diameter of at least 10 μm and can be permanently or releasably secured on a power tool or be connected by a suction conduit with a suction head attached to the power tool.

German Publication DE 198 27 173 discloses a separator for a hand-held power tool and which is formed as a cyclone separator. The separator is formed essentially of a feeding tube that opens in a cylindrical forechamber. The forechamber is located within a collecting container in which separated material particles are collected. For removal of the partially purified air, there is provided an immersion pipe that projects into the forechamber from above.

A drawback of the known separator consists in that it requires a relatively large constructional space in order to insure a satisfactory filtration efficiency. In addition, the separator has a relatively bulky geometry. This leads, in particular with integration of the separator in the power tool, to a poor handling of the separator.

Accordingly, an object of the present invention is to provide a coarse separator in which the drawbacks of the known separator are eliminated.

Another object of the present invention is to provide a coarse separator as compact as possible.

SUMMARY OF THE INVENTION

These and other objects of the present invention, which will become apparent hereinafter, are achieved by providing a coarse separator that includes a lamella separator. With use of a lamella separator, the shape of a coarse separator can be relatively arbitrary determined. In addition, a lamella separator provides for a very compact shape of a coarse separator. The compact shape of a coarse separator according to the present invention permits to better integrate it in the suction device or it can so be mounted on a power tool so that its handling during an operation is not negatively affected.

According to an advantageous embodiment of the present invention, there is provided, at a side of the lamella separator remote from the inlet opening, an opening region or simply an opening of a catch chamber. The catch chamber insures that a reliable and a satisfactory dimensioned receptacle is provided for receiving material particles separated at the lamella separator.

In effect, the catch chamber is open only at this opening. With the opening provided only at one side, the air, which is entered into the catch chamber with an air flow flowing through the inlet opening, bottles up in the catch chamber. The bottling-up of air provides for at least partial short-circuiting of the air flow from the inlet region about the lamellas of the lamella separator toward the outlet opening. The material particles, in particular the heavy ones, are separated from the air flow due to their inertia and are accumulated in the catch chamber. With such separation of material particles, the separator requires a particularly little constructional space and can be economically produced.

Advantageously trap means is provided in the catch chamber for blocking displacement of material particles collected in the catch chamber from displacement in a direction of the opening of the catch chamber. The trap means prevents the particles, which are accumulated in the catch chamber, from leaving the catch chamber as a result of rotation of the power tool or of the separator, or as a result of blows or vibrations produced during operation of the power tool.

Advantageously, the trap means is formed by catch walls projecting into the catch chamber and tilting away from the catch chamber opening toward their free ends. The formation of the trap means as catch walls provides for simply produced trap means that provides for an easy entry of the particles into the catch chamber while simultaneously blocking their reemergence from the catch chamber.

Preferably, the lamella separator has a plurality of lamellas arranged parallel to each other and one after another in an entry direction of the air flow and which partially sidewise limit an inlet path which extends between the inlet opening and the opening of the catch chamber in a direction of the outlet opening. The lamellas form, at their ends adjacent to the inlet path, an acute angle with the inlet path.

In this way, on one side, lamellas prevent a sidewise exit of at least heavy particles carried by the air flow from the inlet path extending toward the catch chamber. On the other hand, the air flow that flows around the entry side ends of the lamellas, can flow between the lamellas, without encountering any large flow resistance, toward the outlet opening. Simultaneously, a relatively high filtration or separation efficiency regarding the material particles carried by the air flow, is achieved. Thus, a high purification efficiency at a small flow loss is achieved.

It is advantageous, the lamellas are bent in the entry direction of the air flow at their ends adjacent to the inlet path. This increases the flow path about the lamellas, which increases the separation efficiency.

Advantageously, the entry direction extends in a direction a gravity force acts, in a horizontal position of the power tool, and which corresponds to a main direction of the coarse separator.

As a result, not only the air flow carries the material particles in the direction of the catch chamber but they are also displaced by a gravity force.

Advantageously, the inlet opening is formed by a nozzle, in particular, a slotted nozzle. This provides for an optimal flow velocity independent on the power of the suction generator, which permits to achieve a maximal efficiency.

It is further advantageous, when a removable cover that limits the catch chamber from one side, also abuts, in its mounted position, end surfaces of the lamellas.

With a common cover for both the catch chamber and the lamellas, the removal of the cover for emptying the catch chamber simultaneously makes the lamellas accessible for cleaning.

Advantageously, the coarse separator housing is securable to the power tool housing. Thereby the separator is moved together with the power tool during operation, which permits to effect a rapid and easy exchange at different sites the power tool is used at.

Advantageously, the outlet opening is connected with a fine separator. This permits to combine a coarse separator with a fine separator, e.g., a filter, which provides for a high separation efficiency, without a need to use a complicated fine separator.

This permits to increase the operational period within which the fine separator is added and to achieve an improved separation of the material particles from the air flow.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
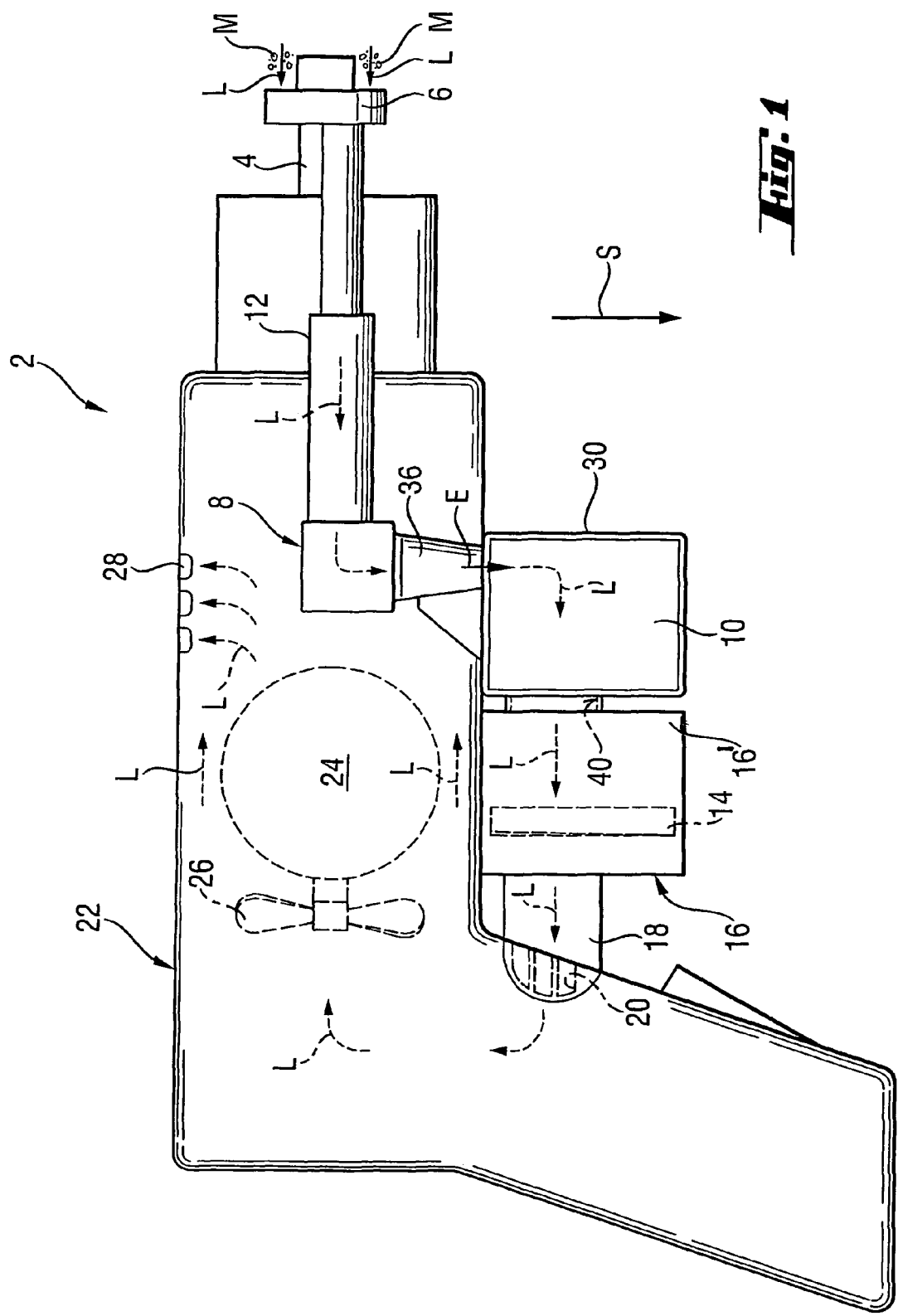
FIG. 1 a side elevational view of a power tool with a suction device that includes a coarse separator according to the present invention.

FIG. 1 shows a power tool 2 that is formed as a hand-held hammer drill or chisel hammer. The power tool 2 is equipped with a working tool 4 in form of a drill or chisel, respectively. A suction head 6 of a suction device, which is generally designated with a reference numeral 8, is held adjacent to the working tool 4. The suction device 8 includes a coarse separator 10 which is connected with the suction head 6 by a connection conduit 12. Instead of a hammer drill or chisel hammer, the coarse separator 10 can be conveniently used with hand-held saw, cutting or grinding tool.

The coarse separator 10 is connected with a fine separator 16 which is provided with a filter 14 located in a housing 16' of the fine separator 16. The fine separator 16 is connected at its side remote from the coarse separator 10 with ventilation slots 20 formed in the housing 22 of the power tool 2. A ventilation conduit 18 connects the fine separator 16 with the ventilation slots 20. In the tool housing 22, there is arranged a ventilator 26 driven by a motor 24. Upon actuation of the motor 24, the ventilator 26 generates an air flow shown with arrow L. The air flow L enters the suction device 8 at the suction head 6 and flows to the ventilator 26 through the connection conduit 12, coarse separator 10, fine separator 16, and the ventilation slots 20. The ventilator 26 then directs the air flow L past the motor 24 and to outlet recesses 28 formed in the housing 22.

On one hand, the air flow L provides for suction of material particles M which are released upon operation of the working tool 4 from a treated material. On the other hand, the air flow L serves for cooling of the motor 24.

The coarse separator 10 has a substantially cuboid-shaped housing 30 secured on the housing 22 of the power tool 2. Alternatively, the coarse separator 10 can be formed as a part of a suction device that is formed separately from the power tool 2 and is connected with the suction head 6 by a hose.

Figure 2:
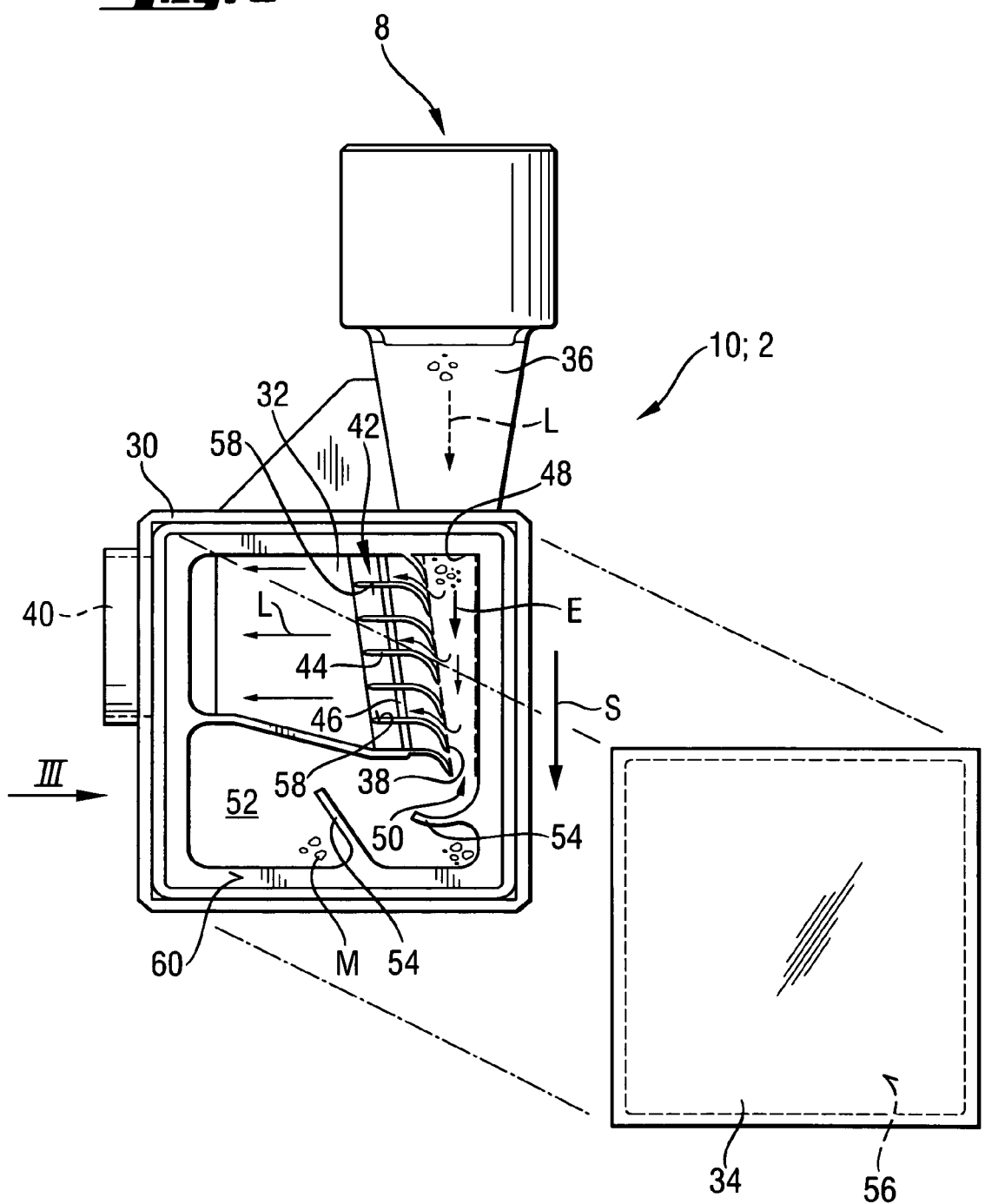
FIG. 2 a front elevational view of the coarse separator shown in FIG. 1.

As shown in FIG. 2, the separator housing 30 has an inner chamber 32 that is completely closed at one of its sides with a removable cover 34 of the housing 30. A nozzle 36, which is formed as a slotted nozzle and is connected to the connection conduit 12, opens into the inner chamber 32.

The nozzle 36 faces in a direction of an inlet path 38 which is partially limited in the inner chamber 32 in a direction of an outlet opening 40 by a lamella separator generally designated with a reference numeral 42. The fine separator 16 is arranged at the outlet opening 40 in communication therewith, as shown in FIG. 1.

The lamella separator 42 has a plurality of extending parallel to each other lamellas 44 which are held one behind the other on a center web 46 in a direction E of entry of the air flow L, as particularly shown in FIG. 2. The lamellas 44, as also shown in FIG. 2, extend with their ends adjacent to the outlet opening 40 in a direction of the outlet opening 40 and substantially transverse to the entry direction E. The lamellas 44 bend toward their ends adjacent to the inlet path 38 in the entry direction E.

Figure 4:
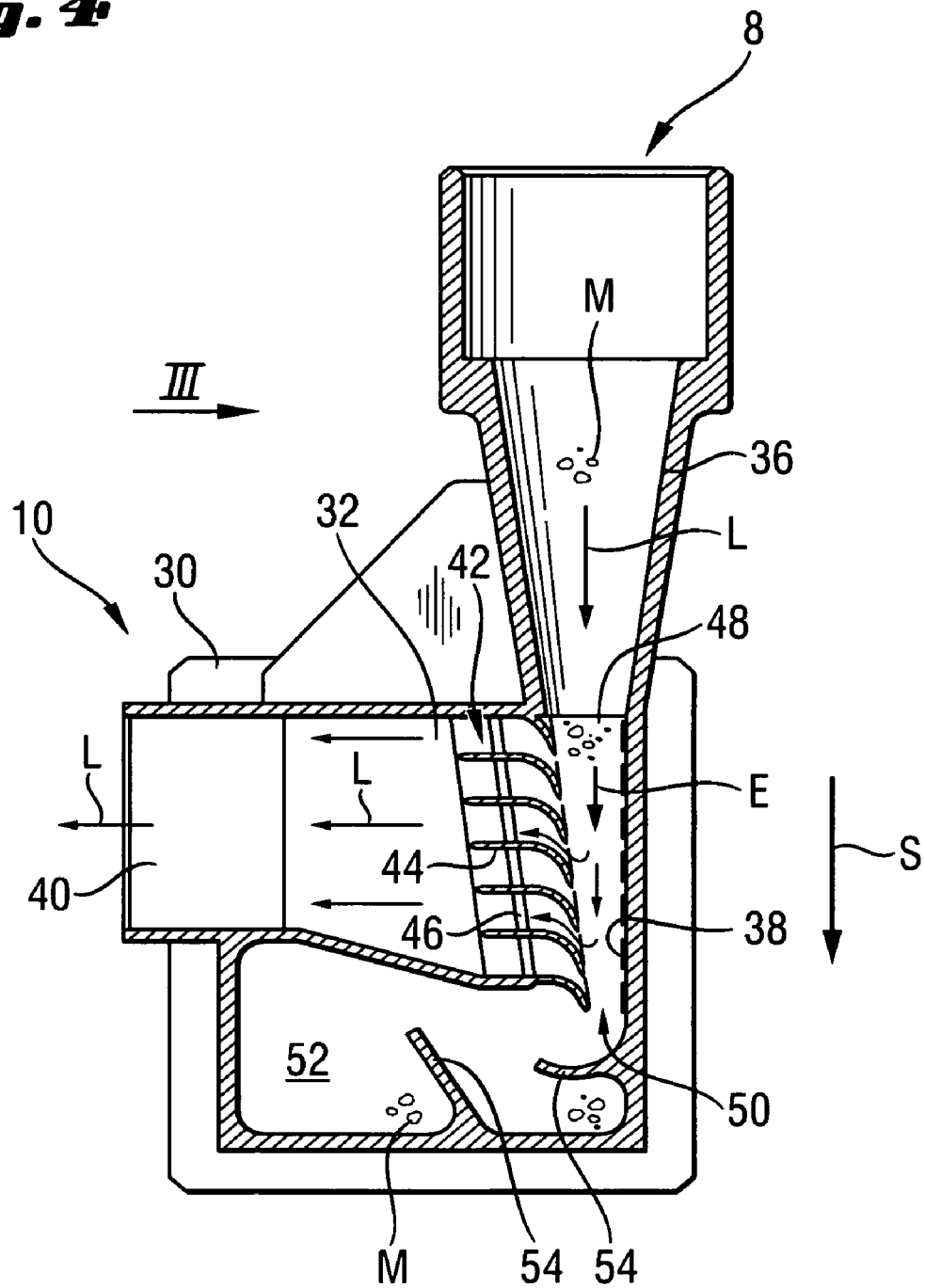
FIG. 4 a cross-sectional view of the coarse separator along line IV-IV in FIG. 3.

As shown in FIG. 4, the nozzle 36 forms an inlet opening 48 that defines a first end of the inlet path 38. At a second end of the inlet path 38 remote from the first end, there is located an opening 50 of a catch chamber 52. The catch chamber 52 is open, with the cover 34 being attached, at the opening 50.

Trap means in form of catch walls 54, which project from the housing 30, extend into the catch chamber 52. The catch walls 54 tilt away from the opening 50 toward their free end.

The coarse separator 10 is so held on the power tool 2 that the entry direction E somewhat coincides with the direction S of the gravity force when the power tool 2 extends in a horizontal direction which forms a main direction of the power tool, and with a wall-to-wall mounting, of the coarse separator 10.

During an operation, the working tool 4 is driven by the motor 24 in a manner not shown in detail. Simultaneously, the motor 24 drives the ventilator 26 that produces, as it has been described above, the air flow L from the suction head 6 toward the outlet recesses 28. With the air flow L, the material particles M are aspirated at the suction head 6 and are transmitted by the connection conduit 12 and through the nozzle 36 to the coarse separator 10.

In the coarse separator 10, the material particles M enter through the inlet opening 48 and move along the inlet path 38 in the entry direction E, as particularly shown in FIGS. 2 and 4. The air flow L meanwhile bottles up in the catch chamber 52 which is open only at one side, so that a following air flow L or at least a major portion of it is deflected in the inlet path 38 and flows past the ends of lamellas 44 adjacent to the inlet path 38 in a direction of the outlet opening 40.

The material particles M, which are carried by the air flow L, are displace due to their inertia and, at the main direction of the power tool 2, due to the gravity force S, further in the direction of opening 50 through which they enter the catch chamber 52. In this way, the material particles M, which are separated by the lamella separator 42 form the air flow L, accumulate in the catch chamber 52. The catch walls 54 block an undesired reemergence of the material particles M from the catch chamber 52.

Figure 3:
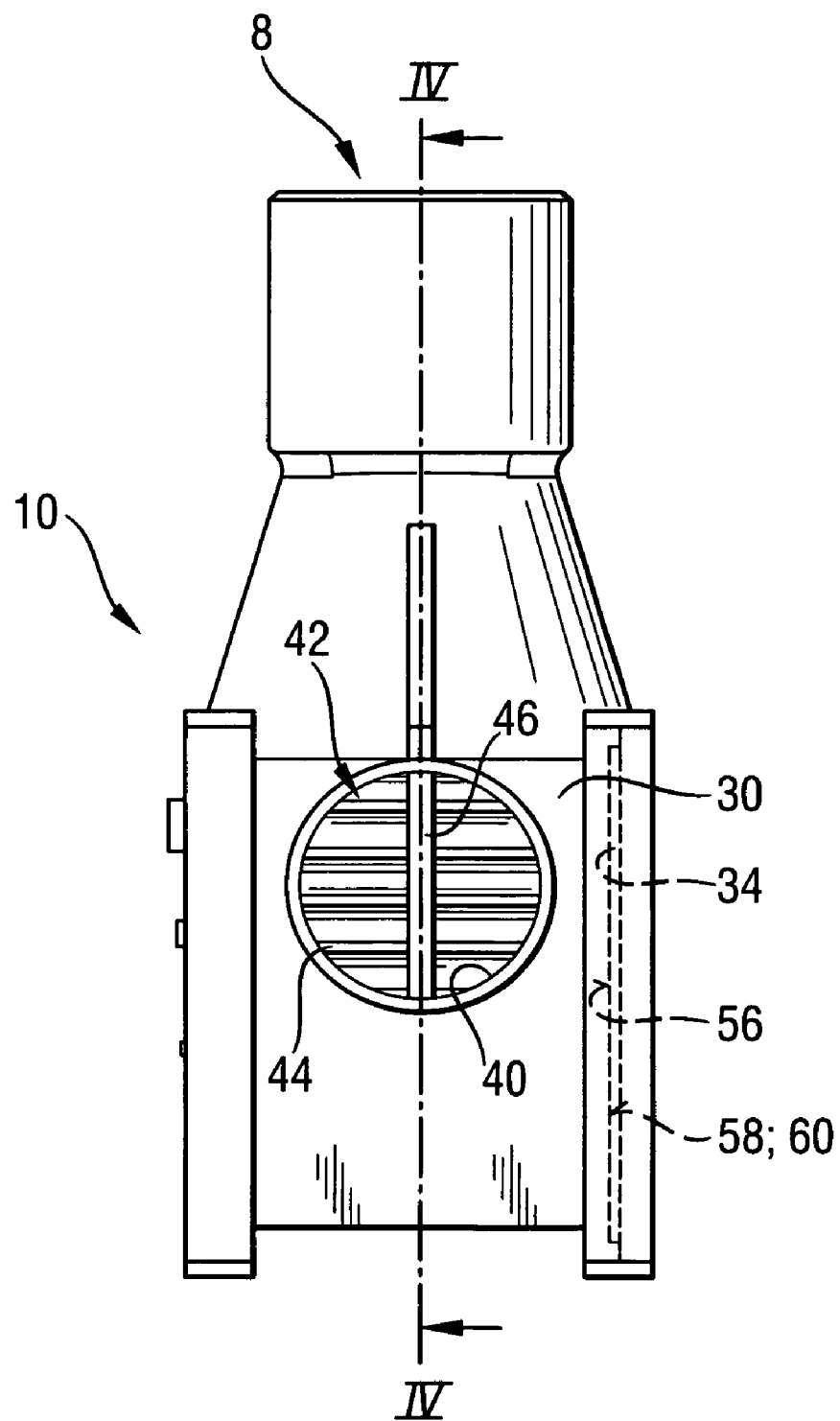
FIG. 3 a side view of the coarse separator shown in FIGS. 2 and 4 in a direction III of an outlet opening.

In order to empty the catch chamber 52, the cover 34 is taken off the coarse separator housing 30. In the mounted condition of the cover 34, the cover 34 lies, as shown in FIG. 3, with its inner surface 56 on the cover-side end surfaces 58 of the lamellas 44 and on the cover-side inner end surface 60 of the coarse separator housing 30. Thus, with the cover 34 being removed, both the catch chamber 52 and the lamella separator 42 are accessible for cleaning.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A coarse separator (10) for a power tool (2) for separating, at least partially, from an air flow (L), material particles (M) produced during operation of the power tool (2) and aspirated by a suction device (8) including a suction head (6), the coarse separator comprising:
an inlet opening (48) connectable with the suction head (6);
an outlet opening (40) for letting a purified air flow (L) out;
a lamella separator (42) located between the inlet opening (48) and the outlet opening (40) and extending in an entry direction of the air flow (L);
a catch chamber (52) located at a side of the lamella separator (42) remote from the inlet opening (48) and having an opening (50); and
an inlet path (38) connecting the inlet opening (48) and the opening (50) of the catch chamber (52), the lamella separator (42) having a plurality of lamellas (44) arranged parallel to each other and one after another along the inlet path (38), sidewise limiting the inlet path (38), and forming, at ends thereof adjacent to the inlet path (38), an acute angle with the inlet path (38),
wherein the catch chamber (52) is open on one side, and wherein the coarse separator further comprises a removable cover (34) for closing the one side in a mounted condition of the cover (34), whereby the catch chamber (52) is open only at the opening (50) thereof connected with the inlet opening (38).

2. A coarse separator according to claim 1, wherein the lamellas (44) are bent in the entry direction of the air flow (L) at the ends thereof adjacent to the inlet path (38).

3. A coarse separator according to claim 1, further comprising a removable cover (34) that limits the catch chamber (52) on one side and that abuts, in a mounted position of the removable cover (34), end surfaces (58) of the lamellas (44).

4. A suction device for a power tool, comprising:
a suction head (6);
a coarse separator (10) for separating, at least partially, from an air flow (1), material particles produced during operation of the power tool (2), the coarse separator (10) having:
a housing (30) including an inlet opening (48) connectable with the suction head (6) and an outlet opening (40) for letting a purified air flow (L) out,
a lamella separator (42) located between the inlet opening (48) and the outlet opening (40) along an inlet path (38) of the air flow (L) and having a plurality of lamellas (44) arranged parallel to each other and one after another along the inlet path (38) sidewise limiting the inlet path (38), and forming, at ends of the lamellas (44) adjacent to the inlet path (38), an acute angle with the inlet path (38), and
a catch chamber (52) located at a side of the lamella separator (42) remote from the inlet opening (48) and having an opening (50) with the inlet path (38) connecting the inlet opening (48) and the opening (50) of the catch chamber (52),
wherein the catch chamber (52) is open on one side, and wherein the coarse separator further comprises a removable cover (34) for closing the one side in a mounted condition of the cover (34), whereby the catch chamber (52) is open only at the opening (50) thereof connected with the inlet opening (38); and
a fine separator (16) having:
a housing (16') provided at the outlet opening (40) of the coarse separator (10), and
a filter (14) located in the housing (16') of the fine separator (16).

5. A suction device according to claim 4, wherein the coarse separator comprises trap means provided in the catch chamber (52) for blocking displacement of material particles (M) collected in the catch chamber (52) from displacement in a direction of the opening (50) of the catch chamber (52).

6. A suction device according to claim 5, wherein the trap means is formed by catch walls (54) projecting into the catch chamber (52) and titling away from the opening (50) of the catch chamber (52)).

7. A suction device according to claim 4, wherein the inlet path (38) extends in a direction (S) the gravity force acts in a horizontal position of the power tool that corresponds to a main direction of the power tool.

8. A suction device according to claim 7, wherein the inlet opening (48) of the coarse separator is formed by a nozzle (36).

* * * * *